Figure 5:
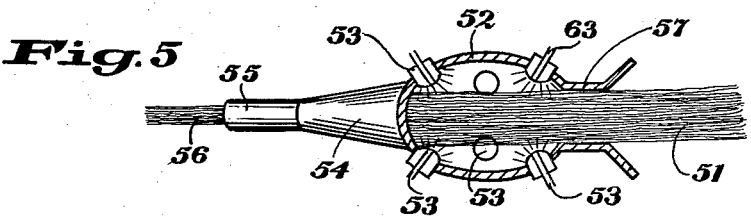

June 15, 1965   P. L. COBB, JR., ETAL   3,189,506
METHOD AND APPARATUS FOR FORMING CONTINUOUS FILAMENT FILTER RODS
Filed April 12, 1962   2 Sheets-Sheet 1
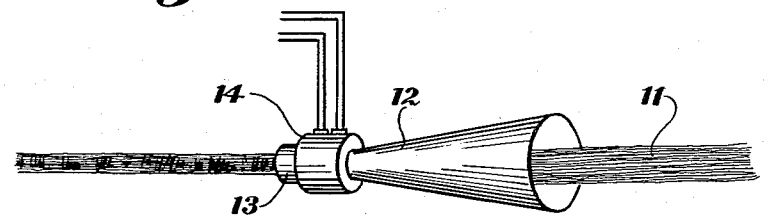
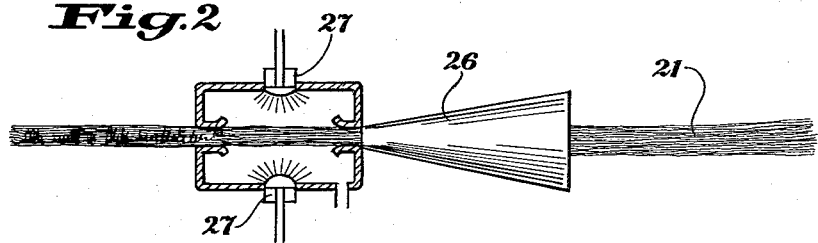
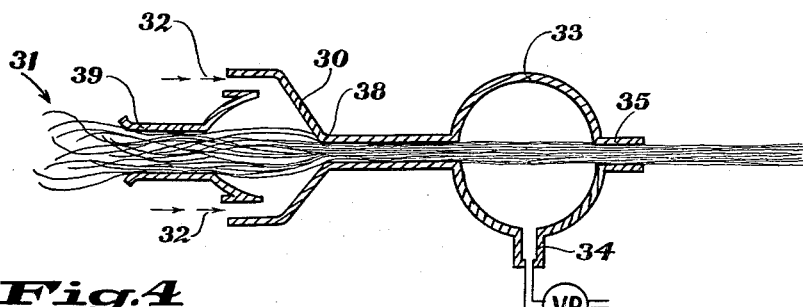
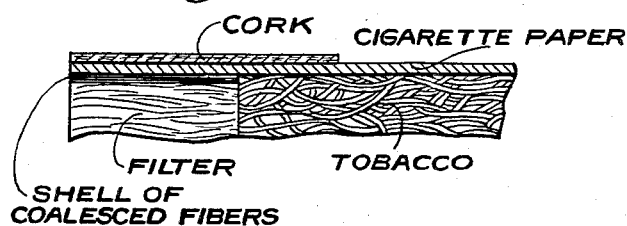
*Phara Lee Cobb, Jr.*
*Melvin Rawlings Hargrave*
INVENTORS
BY
ATTORNEYS June 15, 1965   P. L. COBB, JR., ETAL   3,189,506
METHOD AND APPARATUS FOR FORMING CONTINUOUS FILAMENT FILTER RODS
Filed April 12, 1962   2 Sheets-Sheet 2

Phara Lee Cobb, Jr.
Melvin Rawlings Hargrave
INVENTORS

BY R. Frank Smith
Harold N. Powell
ATTORNEYS

United States Patent Office 3,189,506
Patented June 15, 1965

3,189,506
METHOD AND APPARATUS FOR FORMING CONTINUOUS FILAMENT FILTER RODS
Phara L. Cobb, Jr., Kingsport, Tenn., and Melvin R. Hargrave, New York, N.Y., assignors to Eastman Kodak Company, Rochester, N.Y., a corporation of New Jersey
Filed Apr. 12, 1962, Ser. No. 186,891
3 Claims. (Cl. 156—296)

The present invention relates to rod-like elements useful as filters for tobacco smoke and other purposes. More particularly, the invention is concerned with unitary rod-like structural elements comprised of certain thermoplastic types of fibers, which rod-like elements are suitable for use as cigarette filter tips as well as filters for use in pipes and in holders for cigars and cigarettes.

This application is a continuation-in-part of our allowed, parent application Serial No. 762,382, now U.S. Patent No. 3,079,930. As explained in said parent patent, the efficiency of cellulose esters, particularly the cellulose acetates, as a tobacco smoke filtering material has been known for some time. It has been shown that cellulose acetate for instance will remove from tobacco smoke higher percentages of nicotine, tars and the like than will other materials commonly employed for filtering these substances from the smoke. It is also known that cellulose acetate absorbs relatively less of the moisture in the smoke and thereby does not produce harshness by drying the smoke. As further explained in said parent application, we have found certain other filamentary materials which are useful in the manufacture of rod-like elements.

We have discovered that polyolefin material comprising elongated strands of fibers substantially longitudinally aligned can be formed into rod-like elements of an increased efficiency in accordance with the present invention. We have found a procedure whereby filter elements of the described type having unexpectedly good filtering properties may be prepared. According to our procedure, rod-like elements are obtainable which have not only good filtering properties but, what is at least equally if not more difficult of achievement, proper character for use with standard cigarette manufacturing and packaging machinery.

Therefore, it is an object of the present invention to form structurally unitary rod-like filter elements of polyolefin types of fibers in which an elongated compact strand of a multiplicity of fibers has its fibers substantially aligned longitudinally of the rod. It is a further object of the present invention to develop a rod-like filter material which will meet the requirements of the cigarette industry and which in this regard will be suitable for use as a tip material for manufactured cigarettes. A particular object is to provide a unitary rod-like tobacco smoke filter element composed of polyolefin fibers such as fibers of polyethylene or polypropylene.

Still another object of the invention is to provide a rod-like element which is self-supporting and requires no extraneous material to serve as a retaining wall. A further object of the invention is to provide a low cost, easily made rod-like element of a type in which standardization is possible whereby use in present day cigarette manufacturing machines may be had. Still another object of the invention is to provide a filter element having suitable porosity, suitable integrity, useful filtering ability, uniform composition, adequate rigidity and resiliency and suited for use in cigarettes, pipes or in holders for cigarettes and cigars. Still another object is a method for manufacturing filters which meets the above-outlined requirements. A further object is to provide a method whereby fibers of the filtering mass may be welded both within the interior of and on the surface of the mass in such a way as to provide a consolidated integral structural unit of substantially uniform characteristics. Other objects will be evident from the following disclosure.

In accordance with our invention, broadly, a rod-like filter element is prepared from fibrous polyolefin such as polyethylene in such a manner that the element comprises a unitary rod-like member having fibers which in the aggregate are parallel but which in short portions of individual fibers may run in random directions. Generically, the filter rods comprise elements of the type described in which the fibers are bonded into a structurally unitary form by means of fusion or coalescence at points of contact. The fusion may be brought about by the action of heat on thermoplastic portions of the fibers. A coalescence or joining may be caused by partial or incipient softening of or monomeric addition to the fibrous material to bring portions of the individual fibers into a condition in which they will flow into or otherwise join similar masses of plastic material in the other fibers contiguous thereto. The filters advantageously are formed from a continuous fiber strand which is a tow of continuous filament yarn. Beginning with a strand of fibers, the material is treated to produce tackiness in the surface of at least some of the fibers and is then consolidated by means of a condensing tube or the like through which the strand is run, whereby to bring the fibers firmly into contact with each other and to cause coalescence and adhesion between the fibers as desired.

For assistance in a further understanding of our invention, reference is made to the attached drawings forming a part of the present application.

Figure 6:
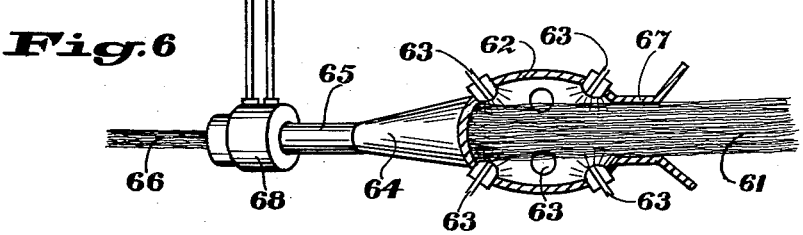
Figure 8:
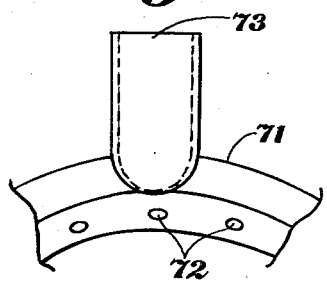
Figure 7:
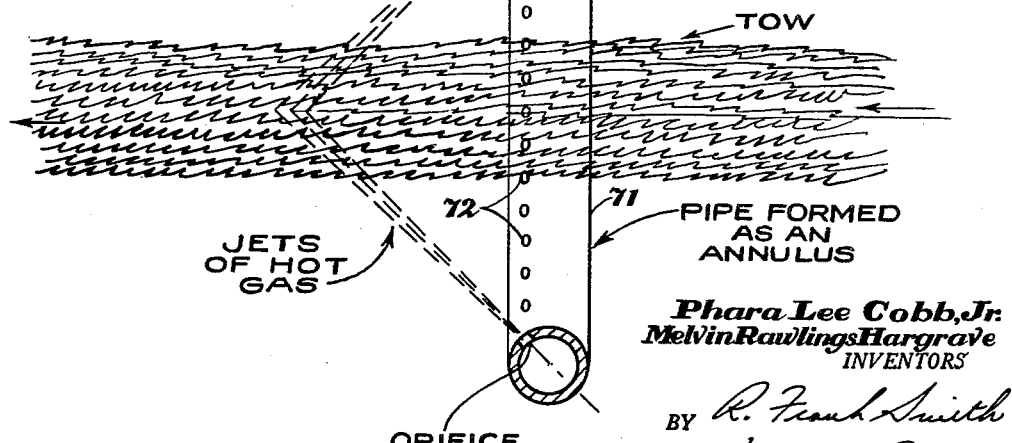

FIG. 1 is a diagrammatic perspective of a method of forming filter elements in accordance with one specific embodiment of the invention wherein a heated condensing tube is employed to shape a fiber strand and fuse portions of the fibers thereof, FIG. 2 is a diagrammatic illustration, in longitudinal vertical section, of a modification in which liquid chemicals, e.g. monomeric bonding materials may be applied to produce fusion and coalescence within and at the surface of the strand, FIG. 3 illustrates diagrammatically, in longitudinal vertical section, a method of preparing filters in accordance with the invention wherein a heating gas is employed whereby to obtain internal welding between the fibers of a strand, FIG. 4 is an enlarged partial longitudinal section of a filter tip end of a cigarette provided with a filter rod of the invention, FIG. 5 is a diagrammatic illustration, in longitudinal vertical section, of an apparatus and method for preparing rod-like elements using a liquid spray, and FIG. 6 is a diagrammatic illustration, in longitudinal vertical section, of apparatus similar to that of FIG. 5 with additional means for achieving complete coalescence of and outer skin formation from surface fibers, FIG. 7 is a side elevation view partly in section of a particularly useful heating means, FIG. 8 is a partial front view of the heating device of FIG. 7.

With reference to the drawings, two types of apparatus and method for making more or less generic filter rods in accordance with the invention are illustrated in the embodiments of FIGS. 3 and 5. In FIG. 3, a fiber strand 31 containing a suitable percentage of thermoplastic fibers is passed into a device whereby heat is applied to the fiber mass throughout by means of heated inert gas. It will be observed that the strand 31 in an uncompacted condition is passed through a member 39 which directs the yarn into a confined space defined by the bell shaped portion of the member 39 and a flaring portion of element 30, which latter element in its tapering and constricted portion indicated at 38 constitutes a condensing tube. Within the confined region defined by the relative spacing of elements 39 and 30, the fiber is subjected to a current of highly heated gas such as air, nitrogen, carbon dioxide or the like. The gas is introduced as indicated by the arrows 32 through the annular passageway. Within the confined space the strand still is in a loose and uncompacted condition susceptible to the passage of the heating gas into and through its interstices whereby an even heat is applied both to the surface and within. Thermoplastic portions of the fibers having been brought to a state of fusion, the strand is next passed through the condensing tube portion 38 of suitable transverse section wherein it is condensed and shaped into a desired form and passed thence into a chamber formed by surrounding walls 33 at which point the fibers become somewhat cooled and solidified and the thus treated strand assumes a structurally unitary rod-like condition. A vacuum may be applied to the mouth 34 of the chamber defined by walls 33 whereby all of heating gas may be withdrawn from within the fibrous mass. In passing out of the chamber through exit 35 the fiber rod is further cooled while still maintained under the shape given to it by the condensing tube 38 and from 35 emerges a structural unitary filter rod of fibers substantially longitudinally aligned and welded to each other at random points throughout the rod. The term "rod" as employed herein signifies a mass which is structurally unitary, or substantially so, and capable independently of substantially retaining its size and shape. The "rods" are flexible and resilient to some extent.

The apparatus and process of FIG. 3 is particularly useful where the character of the fibers obviates the necessity for a temperature sufficiently high to bring all of the fibers or even entire portions of any of the individual fiber to a plastic condition. With further reference to FIG. 3 it should be mentioned that the tapering and confining portion 38 which serves as a condensing tube may be provided with additional heating means such as an electric heating coil whereby complete fusion of the surface of the strand may be assured. It is likewise possible to substitute for the hot gas treating chamber any other suitable apparatus such as a copper tube coil surrounding the path of the strand, the coil being provided on its interior surface with holes serving as jets for the heating gas.

The apparatus and method as illustrated in FIG. 5 is similar to that of FIG. 3 except in the respect that it is based upon use of a suitable liquid to achieve fiber bonding. A strand 51 of fiber is illustrated as being passed into a receiving section 57 of a spray treating apparatus. The section 57 serves to confine and regulate the path of the strand but does not exert a substantial compacting effect. Upon leaving the section 57 the strand is subjected to a spray of suitable media within a spray chamber 52. At this point, as may be observed in the drawing, the strand is in a relatively open and loose form whereby liquid from jets 53 is directed upon, into, and through the strand and is able to reach all points within the body thereof. The strand moves through the chamber 52 continuously and leaves the chamber by way of a condensing tube 54 which tapers to a final diameter in member 55 which may be approximately ⅓ of the diameter of the strand passing under the jet. The effect of the liquid, as a suitable monomer, is to cause a bonding zone on the fibers where it contacts them so that during compaction of the fiber mass in member 55 of the apparatus, adhesion occurs between adjacent fibers at random zones of contact, and the strand is formed into a resulting rod 56 which is structurally unitary as it emerges from the discharge end of the member 55 and more or less retains its size and shape, the fibers being welded or joined to each other at various points throughout the body of the rod.

The apparatus of FIGS. 1 and 2 is particularly designed to provide a modified rod-like element in accordance with the invention, and that of FIG. 6 shows the most advantageous process and apparatus. As treated in accordance with FIG. 1, a strand 11 is passed into a tapered condensing tube 12 which is funnel-like in nature and reduces the diameter of the strand to a desired size by transversely, vertically, and obliquely compacting the fibers in a plane perpendicular to the longitudinal axis thereof. The condensing tube has a constant diameter at its discharge end 13, the portion of constant diameter being heated by means of an electric coil 14 or an equivalent such as a steam coil, dielectric device, etc. The temperature of the heating element and the rate of movement of the strand are so controlled that the surface fibers of the bundle are substantially all heated to the fusion point in passage through the tube whereby they coalesce to form a continuous outer surface covering or skin at the periphery of the rod formed from the fiber strand. Subsequent to passage through the apparatus of FIG. 1 the resulting rod may be passed to a cutting machine (not shown) which chops the continuous cylindrical shell-encased rod into individual rod elements of appropriate length. These elements may be employed in cigarette manufacturing machinery of known design capable of fitting and joining the elements to the wrapped tobacco body of cigarettes.

The process and apparatus illustrated in FIG. 6 comprises a useful embodiment of the invention in the respect that it produces the most advantageous form of filter. The apparatus is like that of FIG. 5 except that a heating element 68 has been added to provide sufficient heat to the surface regions of the condensed strand whereby to cause complete fusion and coalescence of the surface fibers and thereby result in formation of a continuous outer skin or shell. In the apparatus of FIG. 6 a strand 61 is passed into receiving end 67 of the means 62 and therethrough, monomer being admitted from nozzles 63 if desired. By means of condensing tube 64 the strand is formed into the final shape obtained in portion 65 from which it enters the heating element 68. The element 68 is adapted in combination with a predetermined speed of travel of the fiber rod to heat primarily only the surface portions of the rod to a minimum temperature necessary to achieve formation of a continuous outer surface or skin of coalesced fibers.

In many instances structure 62 may comprise the constructions shown in FIGS. 7 and 8. This is a pipe or metal tube 71 formed as an annulus. A plurality of holes or similar orifices are cut into the annulus as at 72 somewhat off center or on a tangent so that hot gases may be projected angularly against and into the bundle of filaments passing through the annulus. The hot gases are supplied to the annulus through entrance conduit 73.

A satisfactory structure of filter-tipped cigarettes employing filter rod elements of the invention is illustrated in FIG. 4 from which it can be observed that a structurally unitary filter rod having an outer shell of coalesced fibers is joined to a paper wrapped tobacco body by an extension of the paper wrapping of the tobacco. A cork wrapping surrounds and strengthens the joint.

The drawings illustrate the utility of the generic invention and of its various species according to which any one of several types of rod-like elements may be prepared. The elements all comprise structurally unitary rods of fibers substantially aligned longitudinally of the rods and having relatively permanent bonds between adjacent fibers at random points. In the preferred forms of the invention fiber bonding to some extent occurs both in the surface regions and in the interior of the fibers. However, the relative degree of bonding of the fibers in the surface area and of those in the interior may be varied in significant amounts whereby to obtain rods of different characteristics. It will be understood from the foregoing that in one of the advantageous modifications the rod comprises a structure in which the fibers are contained under some compression by a surrounding shell formed by surface fiber fusion or the like, with fibers in the interior integrally bonded to the unit.

It will also be understood from the description of the drawings as given above that the processes for forming the primarily surface-bonded species embodiment comprise the steps of (1) first forming from a strand of fibers in which the fibers are oriented to lie for the most part in longitudinal parallel relationship, a condensed and more compact fibrous mass having a predetermined transverse section which normally will be circular or oval and (2) treating the thus-formed strand by heat or other means in a manner to solidify or weld the mass into a structurally unitary rod (i.e. a shaped bundle having welded fiber bonds) having said predetermined transverse section. The welding may be achieved by fusion of the fibers in the outer surface layers of the condensed strand to produce a continuous relatively smooth surfaced shell. Obviously the continuous lengths of rod can be cut to the desired element lengths and the shape can be varied as regards size and transverse section whereby the elements are adapted for use with various types of cigarettes, hodlers and pipes and in various types of cigarette manufacturing machinery. It may in some instances be desirable to have a greater degree of internal fusion and welding of fibers than is possible where the heating means comprises an element surrounding the bundle. In such a case it may be desirable to supply heat to fibers within the mass without heating the surface fibers to a temperature which is unduly above the melting point of the fibers.

In any event, the product formed where treatment is limited largely to surface heating will consist of a condensed fiber strand compacted within a surrounding skin-like shell, the interior fibers being retained in position within the shell due somewhat to interwelding of the fibers and because of compaction and resulting interlocking among the fibers. Rods formed from treatment of the strand primarily internally with heated gases as described in the embodiments of FIGS. 3 and 5 will differ somewhat in that the welding which occurs internally of the bundle at random zones of contact between the fibers will result in additional unification of the fibers into a single structural element without an outer covering skin. While the amount of internal heating and the amount of fusion produced thereby has a noticeable effect upon the rigidity and resiliency of the finished rod, it has been determined that control of these characteristics may be obtained to some extent through variation in the amount of crimp supplied to the fibers which are employed and variation in the number and denier of the fibers.

The nature of the rod as controlled by the amount of welding is, of course, determined by variations in the rate of heating and rate of air flow as each of these influences the degree of welding.

As evident from the foregoing disclosure, the fibers can be in any one of several arrangements going through the die. A tow, composed of continuously spun, somewhat parallel fibers; a tow, composed of continuously spun, crimped fibers and substantially parallel are some examples. Thus, while the invention contemplates the use primarily of fiber forms serving to produce a rod having fibers substantially longitudinally aligned, the teachings of the invention extend to modifications in which structurally unitary elements with lesser fiber alignment are prepared.

The shaping step requires that the fibers be drawn through the condensing tube by means of a pulling action as opposed to extrusion or forceful feeding into the tube. Thus the melting or fusing of the outside fibers which come in contact with the heated tube surface takes place while the fibers are under some tension. A suitable heated tube as discussed above having a guiding end of funnel shape and a forming land at its shaping end will be suitable, but preferably the tapered portion of the tube should offer an interior surface which is gradual in its constricting action. The fibers, of course, enter the large end of the funnel and are compressed to approximately the desired rod size as they are pulled through the smaller end. It has been found that generally the strand must be compressed to somewhat less than the desired size in order to compensate for a springing-out action of the fibers when the pressure of the tube no longer confines them. The tube may be heated by any method such as circulation of a heat exchange fluid, infra-red radiant heating, dielectric heating, etc.

Liquid treatment may, if desired, be combined with the use of heating gases, and heating gases such as air, nitrogen, carbon dioxide, or steam may contain percentages of monomer vapor. In either event heating of the fibers while in a loose or fluffy form permits the fluid heating medium to penetrate into the interior of the fiber bundle so that on its being subsequently drawn through a tube of smaller diameter, the welding together of heat softened fibers occurs to a depth and degree which may be controlled by proper selection of conditions.

However, while all of the various above-mentioned modifications fall within the basic concept of the present invention which envisions a unitary structural rod comprising a shell-encased fiber bundle, we have found the most advantageous embodiment to be that wherein the shell is formed by coalescence of the fiber in the surface region of the fiber bundle. Such a structure may be used in combination with an additional covering of paper if desired, especially where there is only partial or discontinuous skin formation from fusion.

In addition to use as an improved filter for removal from tobacco smoke of tar, nicotine and like components distilled from tobacco, the rods of the present invention are suitable for use as wicks, components of cushions, shock absorbers and packing materials where advantage may be taken of the high resiliency. The material also is useful as absorbent packing. The invention is further illustrated in the following examples:

*Example I*

A tow of continuous filament crimped polyethylene fibers was passed in sufficient bulk through a condensing tube of circular dimensions equipped with a heating element. The compressed fibers passing through the tube were pulled along at a rate needed to allow the surface fibers to melt and adhere together, thus forming a thin, strong binding surface. The apparatus is shown in FIG. 1. The rate of pull-through, the rate of heating, the total denier, denier per filament, the molecular weight-density-melting point of the polyethylene fibers determine the thickness of the binding surface. The tow was 4 denier per filament with a total denier of 35,000. The heated die was used over a range of 100–160° C.

*Example II*

A tow of continuous filament crimped polyethylene fibers was passed through a modified apparatus as of FIG. 3. The hot air chamber in this example was large and considerable hot air was available for heating the filaments. As with other fibers, varying the rate and temperature of the hot air enabled the degree of welding to be controlled and also positioned the welding either on the surface or in the interior. The 90 mm. length rod of 24.9 mm. circ. of 4 denier per filament, 35,000 total denier, had a pressure drop of 8 inches of water.

*Example III*

Using the basic heated air principle as shown in FIG. 3, a coil of copper tubing was drilled with a series of small holes as shown in FIGS. 7 and 8. The hot air, blown from each hole, was directed towards the center of the coil and onto the tow of continuous filament, crimped polyethylene fibers as it was pulled through the coil and through a heated glass condensing funnel. The tow used was 4 denier per filament and 35,000 total denier. The rate of heating on the air through the coil and the spout of the funnel determined the degree of welding.

*Example IV*

A tow of continuous filament, crimped, polypropylene fibers (4 denier per filament and 35,000 total denier) was used as in Example I. The die temperature range was 130–190° C.

*Example V*

The 4 denier per filament, 35,000 total denier, continuous filament, crimped polypropylene tow was passed through the apparatus as described in Example II.

*Example VI*

The apparatus as described in Example III was used to make filter elements from 4 denier per filament, 35,000 total denier, continuous filament, crimped polypropylene tow.

The rods from the aforesaid examples using polyolefin fibers were found to have utility as otherwise favorably compare with the preferred cellulose ester rods of our patent application aforesaid Serial No. 762,382, now U.S. Patent No. 3,079,930.

Although the invention has been described in considerable detail with particular reference to certain preferred embodiments thereof, variations and modifications can be effected within the spirit and scope of the invention as described hereinabove, and as defined in the appended claims.

We claim:

1. In a method for the manufacture of rod-like elements comprised of a core of aligned, crimped, continuous filaments arranged in substantially parallel relationship and generally parallel to the axis of the rod comprising heating the rod to coalesce the filaments and subsequently after shaping into rod-like form forming a fused sheath from the external filaments by heating, the step which comprises heating the filaments to coalesce them during the introducing of hot gases to an annulus surrounding the filaments shaped in rod-like form and projecting hot gases through a plurality of holes in said annulus positioned somewhat off-center and on a tangent angularly against and into the bundle of filaments in rod-like form passing through and surrounded by the annulus.

2. The method of claim 1 wherein after shaping the filaments into rod-like form and fusing the external filaments into a sheath in the second heating step, sufficient heat is provided to the filaments that during the shaping step adhesion occurs between adjacent filaments at random zones of contact and the filaments are formed into a resulting rod which is structurally unitary and capable of retaining its size and shape due to welding and joining to each other at various points of said filaments throughout the body of the rod-like element.

3. Apparatus for forming structurally unitary, continuous filament filter rods of a multiplicity of fibers substantially aligned longitudinally of the rod which comprises respectively in cooperative combination a metal tube formed as an annulus, said annulus having an entrance conduit for supplying hot gases thereto and a plurality of orifices cut thereinto somewhat off-center and at a tangent and positioned structurally whereby hot gases may be projected from said tube against a bundle of filaments passing through the annulus, in association with said tube and at an exit portion thereof a funnel-shaped forming horn adapted to receive a bundle of coalesced filaments from said tube and to form same into a substantially cylindrical-shaped rod, and at the smaller end of said funnel-shaped forming horn means for further heating the bundle of filaments compacted into substantially cylindrical rod-shaped form sufficiently to cause complete fusion of the surface filaments and to coalesce them, thereby resulting in formation of a continuous outer skin.

References Cited by the Examiner

UNITED STATES PATENTS

| | | | |
|---|---|---|---|
| 2,612,966 | 10/52 | Nicol | 131—208 |
| 2,805,671 | 9/57 | Hackney et al. | 131—208 |
| 2,916,038 | 12/59 | Wade | 156—296 |
| 2,979,433 | 4/61 | MacHenry | 156—296 |
| 3,017,309 | 1/62 | Crawford et al. | 131—208 |
| 3,021,242 | 2/62 | Touey | 131—208 |
| 3,038,478 | 6/62 | Touey et al. | 131—208 |
| 3,039,908 | 6/62 | Parmele. | |
| 3,079,978 | 3/63 | Cobb | 131—208 |
| 3,106,501 | 10/63 | Cobb | 131—208 |

EARL M. BERGERT, *Primary Examiner.*

HAROLD ANSHER, M. D. REIN, *Examiners.*